US012618431B2

(12) United States Patent
Atteberry

(10) Patent No.: US 12,618,431 B2
(45) Date of Patent: May 5, 2026

(54) DUAL HOOK

(71) Applicant: Wade Atteberry, Riverdale, CA (US)

(72) Inventor: Wade Atteberry, Riverdale, CA (US)

( * ) Notice: Subject to any disclaimer, the term of this patent is extended or adjusted under 35 U.S.C. 154(b) by 946 days.

(21) Appl. No.: 17/747,600

(22) Filed: May 18, 2022

(65) Prior Publication Data

US 2023/0375033 A1 Nov. 23, 2023

(51) Int. Cl.
| | |
|---|---|
| *F16B 45/02* | (2006.01) |
| *F16B 45/00* | (2006.01) |
| *F16B 45/06* | (2006.01) |
| *B66C 1/36* | (2006.01) |

(52) U.S. Cl.
CPC .......... *F16B 45/022* (2021.05); *F16B 45/023* (2021.05); *F16B 45/035* (2021.05); *F16B 45/036* (2021.05); *F16B 45/037* (2021.05); *F16B 45/06* (2013.01); *B66C 1/36* (2013.01)

(58) Field of Classification Search
CPC .......... B66C 1/36; B60P 3/079; B60P 7/0823; F16B 45/02; F16B 45/037; F16B 45/06; F16B 45/036; F16B 45/035; F16B 45/023; F16B 45/00; F16B 45/026; B60C 27/08; Y10S 24/33
USPC ........ 24/265 H, 582.11, 599.1, 601.2, 600.9, 24/598.5, DIG. 33, 577.1, 698.1, 116 R; D8/356, 367, 373, 372, 396, 382, 323, D8/370, 354, 349; 59/85
See application file for complete search history.

(56) References Cited

U.S. PATENT DOCUMENTS

| | | | | | |
|---|---|---|---|---|---|
| 437,380 | A | * | 9/1890 | Lundbrog ............. | F16B 45/036 24/600.9 |
| 1,165,606 | A | * | 12/1915 | King ..................... | F16B 45/024 24/598.4 |
| 1,449,364 | A | * | 3/1923 | Mcgowan ................. | B66C 1/36 24/599.3 |
| 1,463,604 | A | * | 7/1923 | Wagner ................... | B60C 27/08 81/15.8 |
| 1,709,235 | A | * | 4/1929 | Shaffer ................. | F16B 45/023 24/375 |
| 1,764,813 | A | * | 6/1930 | Olney ................... | F16B 45/036 24/600.9 |
| 2,785,578 | A | * | 3/1957 | Nold ....................... | F16G 13/02 198/850 |
| D303,212 | S | * | 9/1989 | Crowle ........................ | 24/600.9 |
| 5,913,479 | A | * | 6/1999 | Westwood, III .......... | B66C 1/36 24/600.9 |
| D602,348 | S | * | 10/2009 | Berney ......................... | D8/382 |

(Continued)

FOREIGN PATENT DOCUMENTS

| | | | |
|---|---|---|---|
| CN | 203039295 | U * | 7/2013 |
| CN | 205355675 | U * | 6/2016 |

(Continued)

OTHER PUBLICATIONS

Grab Hooks vs Slip Hooks: What's the Difference?, Monroe, Dec. 31, 2020, Rochester Hills, MI, USA.

(Continued)

*Primary Examiner* — Mahdi H Nejad
(74) *Attorney, Agent, or Firm* — James G Passe; Passe Intellectual Property

(57) ABSTRACT

A dual hook device having both a grab hook and a sling hook connected to form one device for hooking chains, ropes, and cables and is capable of lifting heavy objects.

1 Claim, 1 Drawing Sheet

(56) References Cited

U.S. PATENT DOCUMENTS

| | | | | |
|---|---|---|---|---|
| 7,703,735 B2 * | 4/2010 | Fryer | ................. | A47G 25/0614 |
| | | | | 24/372 |
| D686,058 S * | 7/2013 | Paik | ............................... | D8/356 |
| D769,104 S * | 10/2016 | Reid | ............................. | D8/356 |
| D850,241 S * | 6/2019 | Ormsbee | ........................ | D8/356 |
| 11,225,995 B1 * | 1/2022 | Sharma | ................. | F16B 45/023 |
| D1,000,252 S * | 10/2023 | Xia | ................................ | D8/354 |
| D1,061,223 S * | 2/2025 | Gomez | .......................... | D8/367 |
| 2002/0046448 A1 * | 4/2002 | Camaiani | ............. | A44C 5/2038 |
| | | | | 24/599.8 |
| 2009/0000086 A1 * | 1/2009 | Bing | ....................... | F16B 45/06 |
| | | | | 24/592.11 |
| 2016/0341240 A1 * | 11/2016 | Liu | ....................... | F16B 45/022 |
| 2023/0134833 A1 * | 5/2023 | Horgan | ................. | F16G 11/046 |
| | | | | 24/265 H |

FOREIGN PATENT DOCUMENTS

| | | | | | |
|---|---|---|---|---|---|
| CN | 106486925 A | * | 3/2017 | ............... | H02G 1/04 |
| DE | 202014006440 U1 | * | 9/2014 | ............... | B25F 1/00 |
| EP | 1849383 A1 | * | 10/2007 | ......... | A47G 25/0614 |
| JP | 3220034 U | * | 2/2019 | | |

OTHER PUBLICATIONS

Mike Close, What Are the Different Types of Lifting Hooks and Sling Hooks?, Mazella Companies, Apr. 3, 2019, USA.

* cited by examiner

DUAL HOOK

COPYRIGHT NOTICE

BACKGROUND OF THE INVENTION

Field of the Invention

The present invention relates to a device consisting of both a grab hook and a sling hook forged to form one device for the purpose of hooking chains, ropes, cables, lifting heavy objects, and the like.

Description of Related Art

The use of different types of hooks is standard industry practice when used in applications such as lifting, logging, and moving heavy objects. These hooks are also used as cargo securement hooks used to secure heavy loads onto trucks, trains, and ships when transporting goods.

A grab hook is a type of chain shortening or choking hook that's designed to grab a single link of chain for which it is being used with. These hooks are designed for overhead lifting and cargo securement applications. Grab hooks offer a unique design due to their narrow throat opening and can have a cradle or groove at the bottom of the throat. A chain, rope, or the like, is attached to an object and once secured; the chain or rope is attached to the open cradle or groove at the base of the grab hook.

A sling hook is a type of lifting hook that's characterized by the use of a retainer latch and is frequently used in overhead lifting applications. Rather than featuring a narrow throat design as described with the grab hook, the sling hook features an open bowl design. All sling hooks have a safety latch that is used to secure the chain, rope or the like inside the bowl in slack conditions.

The retainer latch on sling hooks consists of a long, solid metal bar. The retainer latch can be opened by pressing inward on it. To wrap the end of a chain or rope around a sling hook, for instance, you can simply press the chain or rope against the retainer latch. With that said, retainer latches only offer a one-way action. The retainer latch is designed to maintain the chain or rope within the confines of the bowl if the rigging presses against it after being installed. The retainer latch is not designed to withstand any load seen by the sling hook.

The main difference between grab hooks and sling hooks is that the former doesn't have a retainer latch, whereas the latter does have a retainer latch. There are several different types of grab hooks, some of which include clevis and eye type connections. Regardless, all grab hooks have an open design without a retainer latch. Sling hooks, conversely, have an open bowl design with a retainer latch. They are also available with a clevis or eye type connection.

Each of these hooks come in different sizes. Depending on the chain size being used and how the load is being lifted, a different type and size of hook would be selected. It is normal for individuals using such hooks to have both grab hooks and sling hooks in their toolbox in order to be prepared for all situations.

BRIEF SUMMARY OF THE INVENTION

The present invention relates to the discovery that if a grab hook and a sling hook used for chains, ropes, cables, lifting heavy objects, and the like are connected linearly with the hooks facing the same direction or 180 degrees aligned, there would not be a need for having multiple versions of hooks. One additional advantage is that while there is a hook on one side being used, the other hook can be used ergonomically as a handle which prevents fingers from getting caught in the hook being used, adding an advantage that is not in use of individual hooks. A single dual purpose hook device can avoid the problems described above.

Accordingly, in one embodiment, there is a dual hook device comprising:

- a) a grab hook having an open cradle;
  - b) a sling hook having a closed cradle;
  - i. wherein the grab hook and the sling hook are aligned and connected linearly through their centers head to toe with the grab hook and sling hook cradles either facing the same way or facing 180 degrees apart aligned; and
- c) wherein a chain connector is positioned on the head of the grab hook and the sling hook is positioned on the toe of the grab hook.

DETAILED DESCRIPTION OF THE INVENTION

Figure 1:
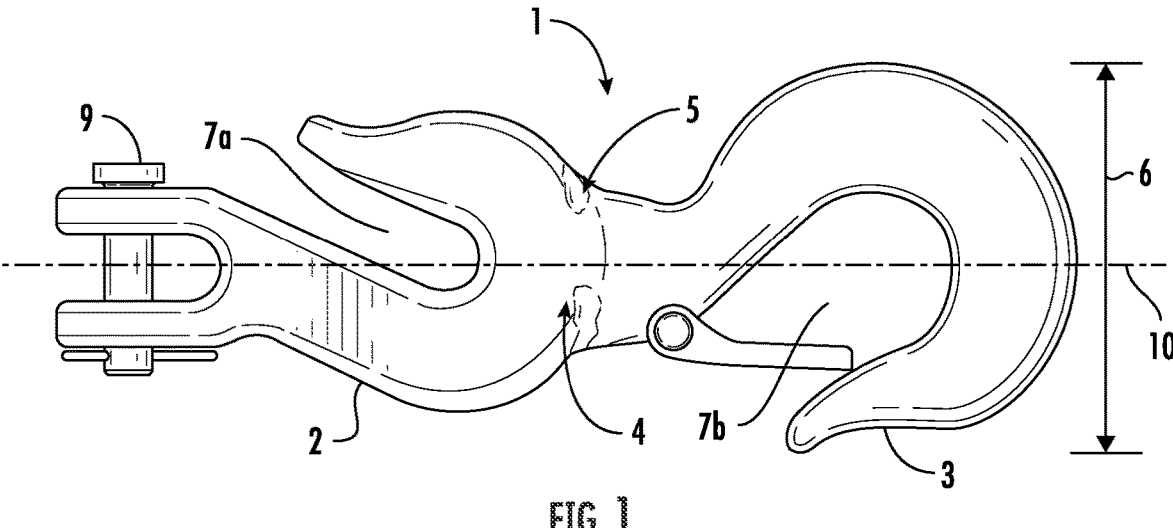
FIG. 1 is a perspective view of a grab hook and a sling hook joined together head to toe.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "dual hook" refers to a device that has both a grab hook and a sling hook, wherein the grab hook and the sling hook are aligned and connected linearly through their centers with the hook cradles facing the same way or facing 180 degrees apart aligned and lying flat on the same plane. In one embodiment, they are joined head to toe, and in another embodiment, they are joined toe to toe. The hook portion is an open cradle, bowl, or groove as shown in the figures. As can be seen in the figures, each of the hooks has a wide side and a narrow side. In making the dual hook, each hook is laid down on the wide side and as described, connected head to toe as shown in the figures. A chain connector is attached to a top of the grab hook and the sling hook is attached to a bottom of the grab hook. The two hooks are aligned linearly along the access as shown in the figures. Chain connectors are well known in the art.

As used herein, the term "a grab hook" refers to a grab type hook that is a type of lifting hook designed to grab an object with which it is being used. They are designed primarily for overhead lifting applications. Grab hooks have an open design that have an open cradle or groove forming the hook shape. The grab hook is positioned on top with a chain connector.

As used herein, the term "a sling hook" refers to a type of lifting hook that is characterized by the use of a retainer latch positioned at the top of the bowl. The retainer latch consists of a long and solid metal spring loaded bar. The latch is opened by pressing the latch inward. The latch however, cannot be opened further by pulling on it (i.e., it offers only a one-way action). The sling hook is positioned below the grab hook.

As used herein, the term "connected linearly" refers to each of the hooks connected head to toe linearly aligning each hook's center line as seen in the figures. This is accomplished by laying both hooks down on the wide side. The figures and their corresponding descriptions contain more specific details.

As used herein, the term "facing the same way or facing 180 degrees apart aligned" refers to the opening of the cradle of each hook either facing the same way or facing 180 degrees apart aligned, as shown in the figures.

Drawings

Now referring to the drawings, FIG. 1 is a perspective view of a dual hook device 1. The dual hook device 1 has a grab hook 2 and a sling hook 3 joined together at sling hook head 5 and grab hook toe 4. It is noted that in this embodiment, they are both laying on the wide side 6 on a flat surface and the cradles 7a and 7b face 180 degrees apart aligned. The center line 10 of each hook is aligned and connected linearly. On top of the grab hook 2, is a chain connection device 9 for attaching the dual hook device 1 to a chain or other desired object. The top of the sling hook head 5 is attached to the toe of the grab hook 2 by use of either a fixed or rotary connector.

Figure 2:
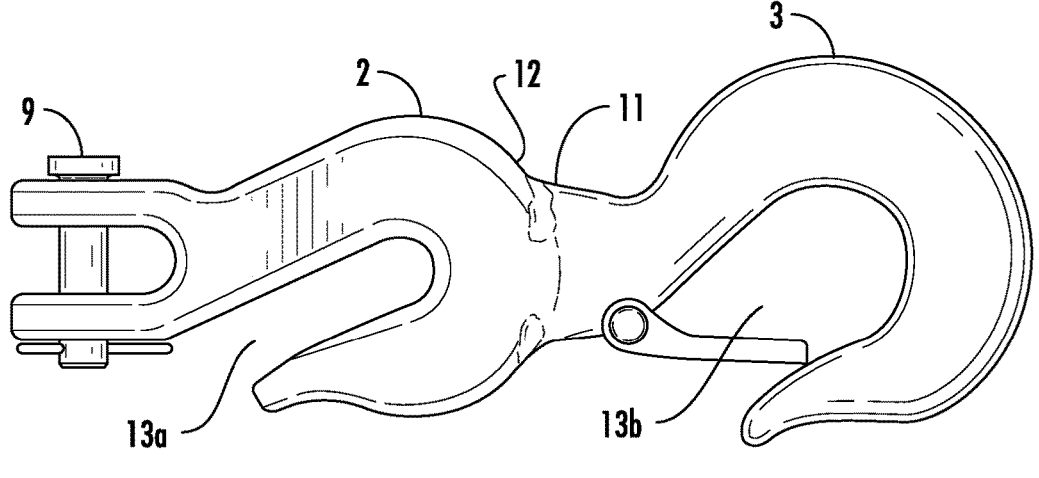
FIG. 2 is a perspective view of the grab hook and the sling hook attached head to toe, with the bowl facing the same way.

FIG. 2 is a perspective view depicting the grab hook 2 and the sling hook 3 attached from sling hook head 11 to grab hook toe 12. In this view, the openings 13a and 13b are facing the same way. In both cases, they are attached linearly and lay flat.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:
1. A dual hook device comprising:
a) a grab hook having an open cradle;
b) a sling hook having a closed cradle;
wherein the grab hook and the sling hook are aligned and fixedly connected linearly through their bend centers head to toe with the grab hook and sling hook cradles either facing the same way or facing 180 degrees apart aligned and wherein the sling hook is directly connected to the bend center of the grab hook; and wherein the bend centers are centers of each rounded sections of the cradles;
c) wherein a chain connector is positioned fixedly on a head of the grab hook and the sling hook is positioned on a toe of the grab hook, and wherein the chain connector is connected linearly through the bend centers of the grab hook and the sling hook cradles and lays planar with respect to the grab hook and the sling hook;
wherein the sling hook comprises a head and a toe; the toe of the sling hook fixedly connected to the head of the grab hook;
and wherein a centerline passes through centers of the heads and the toes of the sling hook and the grab hook and a center of the chain connector.

* * * * *